United States Patent [19]

Sims, Jr.

[11] 4,006,661

[45] Feb. 8, 1977

[54] REUSABLE TORQUE LIMITING FASTENING DEVICE

[75] Inventor: Dewey McKinley Sims, Jr., Westland, Mich.

[73] Assignee: Burroughs Corporation, Detroit, Mich.

[22] Filed: Sept. 29, 1975

[21] Appl. No.: 617,978

[52] U.S. Cl. .......................... 85/62; 151/14 DW; 151/37

[51] Int. Cl.² ........................................ F16B 31/02

[58] Field of Search ............ 85/62; 151/14 DW, 36, 151/37, 38

[56] References Cited

UNITED STATES PATENTS

| | | | |
|---|---|---|---|
| 1,435,216 | 11/1922 | Davis et al. | 151/14 DW |
| 1,611,210 | 12/1926 | Liddell | 151/37 X |
| 1,945,005 | 1/1934 | Vacher | 151/38 |
| 2,350,647 | 6/1944 | Sosnick | 151/37 |
| 2,766,799 | 10/1956 | Poupitch | 151/37 |
| 2,815,059 | 12/1957 | Fiddler | 151/37 |
| 3,030,996 | 4/1962 | Doerr | 85/62 X |
| 3,078,899 | 2/1963 | MacLean et al. | 151/37 |
| 3,144,803 | 8/1964 | Briles | 85/62 X |
| 3,153,974 | 10/1964 | Canning | 85/62 |
| 3,474,701 | 10/1969 | Setzler | 85/62 |

FOREIGN PATENTS OR APPLICATIONS

| | | | |
|---|---|---|---|
| 661,237 | 3/1929 | France | 151/76 |
| A60,759 | 7/1954 | France | 151/37 |
| 17,443 | 1/1967 | Japan | 151/DW |
| 188,523 | 3/1964 | Sweden | 151/36 |
| 1,229,507 | 4/1971 | United Kingdom | 85/62 |
| 870,946 | 1/1961 | United Kingdom | 85/62 |

*Primary Examiner*—Roy D. Frazier
*Assistant Examiner*—Thomas J. Holko
*Attorney, Agent, or Firm*—Carl Fissell, Jr.; Edwin W. Uren; Kevin R. Peterson

[57] ABSTRACT

A reusable torque limiting device producing tactile feedback for a desired preset bolt tensile load comprises a body, provided with an internal bore threaded therethrough so as to be received over a threaded bolt or similar fastening element. One face of the body is provided with a recessed area therein and an angled counter-bore adjacent and concentric with the center thereof. One or more angular, beveled or concave members are disposed within a recess in the body with the concave portion suitably oriented relative to the recess. The work piece engaging face of the body is, or may be provided with, a roughened surface for example radial slots, notches, teeth or grooves so as to gall or abraid the confronting face of the work piece as the device achieves the predetermined bolt tensile load that is desired by allowing the torque rate increase to be easily sensed at which time the operator should stop turning the nut. (This device makes use of the operator tactile senses to achieve accurate tensile load in the bolts.) Additionally, an indication that the annular beveled members are located correctly within the recess in the threaded body of the device is provided by the slots or grooves.

1 Claim, 4 Drawing Figures

U.S. Patent  Feb. 8, 1977  4,006,661
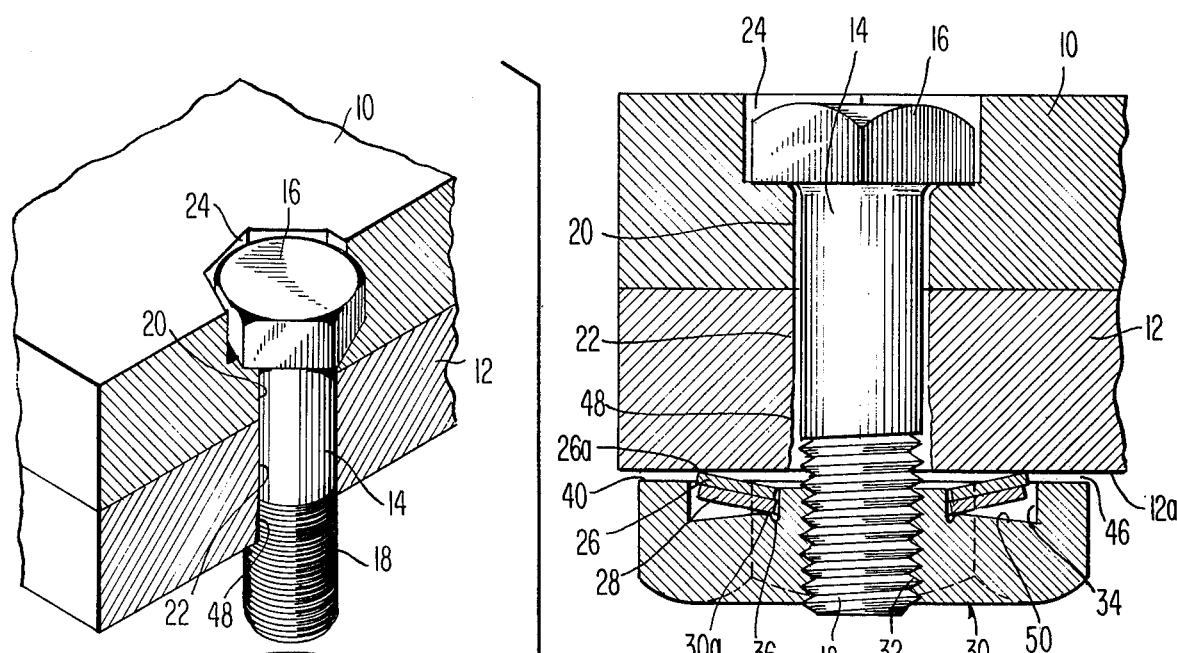
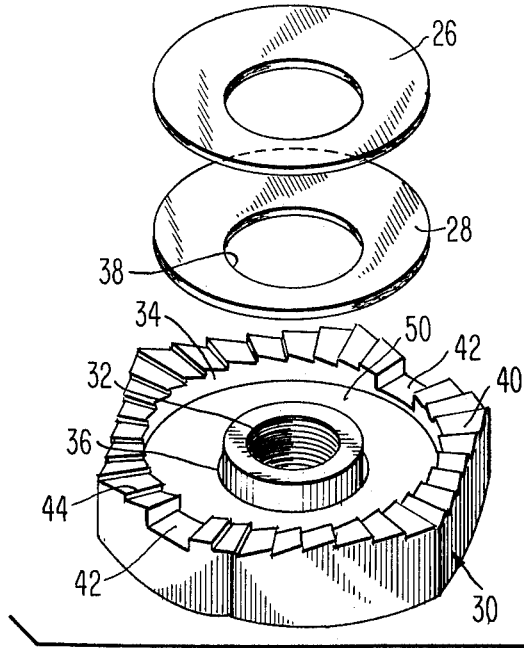
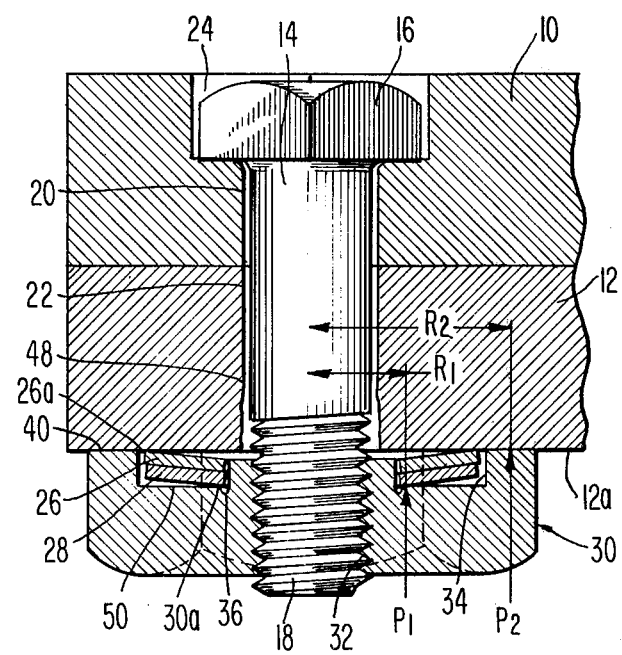
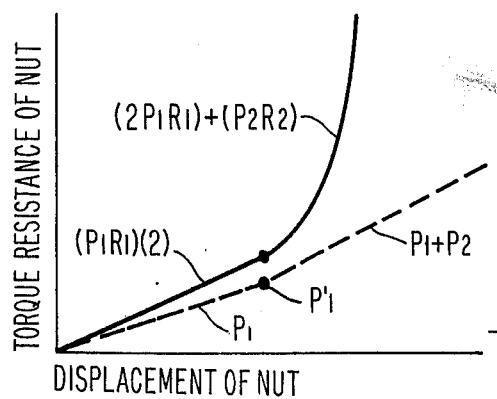

4,006,661

REUSABLE TORQUE LIMITING FASTENING DEVICE

BACKGROUND OF THE INVENTION

Torque limiting devices are old and well known in the industry and include many different varieties of fastening elements, such as nuts, bolts, washers, threaded members, press fit members, springs and similar pieces of apparatus which have been used in countless ways to produce a desired or limited degree of torque when two confronting work pieces are joined together. Note: these devices indirectly try to achieve a specific bolt tensile load by not very accurate methods. In many instances the devices failed for one reason or another or did not provide the exact, correct or repeatable bolt tensile load in which case the work pieces tended to warp. In other instances such devices permitted the elements to come apart because the torque unit backed-off. For example, a nut may back-off a bolt. The type and variety of torque limiting devices is almost endless, but in most instances each of these elements is so highly specialized that the expense of tooling to mass produce such units far out-weighs the accuracy or need.

SUMMARY OF THE INVENTION

The present invention relates to a torque tactile-feedback threaded, fastening device that determines relatively accurately the tensile load in the bolt, and more particularly to a torque limiting device (which its main purpose is to set the bolt tensile load in an indirect method) of the category wherein the fastening element is reusable and is capable of attaching two elements together by means of a bolt or screw and a nut without the intervention or application of any torque applying device other than the human hand. The amount of tooling and machine work that is required is rather minor since certain portions of the construction are or may be purchased items in which case the cost is reduced considerably. In any event, the device is positive acting and can be applied by an operator who may not have available to him or her the appropriate torque wrench or torque limiting equipment.

The invention resides in the use of a torque nut provided with a threaded bore and a concentric recessed area therein with an additional recessed area adjacent the hub formed by the first recess and a pair of concave washer-like members which are adapted to be received within the precisely depth controlled hollow recess of the nut and which provides the resistance necessary to produce the desired bolt tensile load when the nut's outer face contacts the plate as the two or more work pieces are joined together in a confronting relationship.

BRIEF DESCRIPTION OF THE DRAWINGS

FIG. 1 is an exploded isometric view of a preferred embodiment of the present invention;

FIG. 2 is a cross-sectional side elevation view of the embodiment of FIG. 1;

FIG. 3 is a view similar to that of FIG. 2 illustrating the device in fully torqued down condition and, FIG. 4 is a graph depicting the various forces at work during the torque nut tightening operation.

DESCRIPTION OF THE PREFERRED EMBODIMENT

The exploded isometric view of FIG. 1 illustrates a preferred embodiment of the present invention in an environment in which the device can most efficiently be used, i.e., joining two relatively flat confronting work pieces together in planar relationship. In this instance, the two work pieces, 10 and 12, are illustrated as being joined in face to face relationship by means of a bolt 14 having a hexagonal head 16 and a threaded shank 18 extending into and through the two concentric holes 20 and 22 of the work piece with the head 16 recessed in the hexagonally shaped depression 24 in the upper most work piece 10. The threaded extension of the bolt 14 projects fully away from the lower work piece face for reception thereon of a pair of disk-shaped, concave washers 26 and 28 with the concave portions thereof disposed in the vertical position, i.e., facing downwardly as illustrated in FIG. 1.

Hexagonal nut 30 is provided with a central threaded bore 32 therethrough and a counter-bore or recess 34 concentric therewith. The nut is arranged to threadedly engage the bolt 14 and to be tightened thereover as shown particularly in FIGS. 2 and 3 as will be now described more particularly.

As the nut 30, carrying the two concave or disk-shaped washers, 26 and 28 is rotatably tightened onto bolt 14, a point is reached (FIG. 2) where the perimeter, periphery or outer radial portion 26a contacts the surface 12a of the member 12 while the inner radial portion 28a of washer 28 contacts the inner radial portion 30a of the counter-bore 34. A second circular counter-bore 36 adjacent to the threaded bore 32 provides relief for the inner radial edge 38 of the lower washer as seen most clearly in FIGS. 1, 2 and 3. This relief prevents frictional binding as the washer is deflected in it's upward travel against the upper member. Continued tightening of the nut 30 finally brings the upper surface 40 thereof into facing engagement with the lower facing surface 12a of the lower work piece 12 (FIG. 3) at which point the bolt has the correct tensile load and no further turning is desired and is noted by a tactile-feedback rapid increase in torque as will be explained presently.

As previously discussed, the purpose of the present invention is to produce a set tensile load in a bolt with a nut without the use of an external torque wrench. It is known that in the field, service people oftentime just don't carry an expensive torque wrench with them in which case there is no efficient way of determining exactly what torque level to provide which would indirectly indicate the tensile load in the bolt. The present invention works in the following manner to produce a preset bolt tensile load automatically. As the nut is tightened the spring washers are compressed. At the start the nut's torque resistance is relatively small because of the small radius arm at which the normal force on the face of the nut takes place and because of the several locations at which slip can occur (i.e., the surface of contact, plate to washer, washer to washer and washer to nut) and because of the low coefficient of friction between these slip faces. This low force or resistance continues until the outer face of the nut comes into contact with the work piece at which time the torque required to turn the nut increases very rapidly giving a tactile indication that the nut has reached its correct rotative position. A visual indication of the nut being torqued properly is also available. The outer face of the nut can be slotted as at 42 in FIG. 1 as well as serrated or toothed as at 44 in FIG. 1. The serrations increase the rate of torsional resistance the nut will produce if one tends to exceed the desired compression lead while the slots provide an opening through which to view the entrapped washers.

Referring particularly to FIG. 2 of the drawings it is noted that prior to the time that the nut reaches the precise given bolt tensile load that it is desired to generate, there will be a space 46 between the nut and the facing or confronting surfaces of the work piece. The washer or washers will be carrying the tensile load up to that point. Now, as the washer touches the outer edge or perimeter of the work piece 12 it also touches the nut at what has been designated the R1 value. The torque value is the normal pressure times the smallest radius of contact which is R1. This R1 remains small because of the sloped recess 50. Continued turning builds up pressure. The washer carries the tensile load which will continue basically linearly as the force builds up which is the spring rate times R1 as seen in the graph of FIG. 4. As the perimeter of the nut engages the work face there will be a very sharp incline as an effective R2 takes place times the increase in pressure P2. Now the difference between the two values can be exaggerated by lubricating the surface of the concave washers for example, providing a "Teflon" coated surface in contrast to steel to steel which is what is illustrated in the present figure. This produces not only a difference in radius but a difference in friction. It's preferable, of course, to have very low friction at the beginning so that the nut can be spun onto the bolt easily as the concave member is flattened until the outer edge of the nut contacts the plate at which time the torque to turn the nut will increase rapidly giving tactile indication to the operator to immediately stop turning the nut because the desired bolt tensile load for which the device is preset has been reached.

In the present embodiment it was desired to have a precise tensile load and this load is calculated on the basis of the spring rate of the washer, and thus, in this case, since a specific load was desired it required two washers to produce the load. The under-cut or second counter-bore indicated at 36 is provided to prevent interference or binding friction between the washer and the nut as the nut is turned. The radial slots 42 in the perimeter of the nut provides a visual indication that the washer or washers are in fact in place once the nut has been torqued to the desired degree. The toothed area 44 at the perimeter of the nut exaggerates the change in friction from the freewheeling situation as shown in FIG. 2 to the fully torqued condition shown in FIG. 3 this gives the tactile feedback that the device has reached the desired tensile load on the bolt.

Where, as here, the workpieces 10 and 12, or one of them, is provided with holes which are punched out, a characteristic "break-away" condition arises which produces certain problems in the torque device. In the present case the side walls of the hole in the lower piece 12 which is punched are slightly out of round and irregular as seen at 48 in FIGS. 2 and 3. So as to prevent interference between this rough edge and the inner rim or radius of washer 26 the washers are inverted so as to present a low profile in this area.

There has thus been described a reusable bolt tensile load limiting fastening device which is simple, positive acting, relatively inexpensive to use and can be made readily available with a minimum of fabrication steps.

What is claimed is:

1. A reusable, torque tactile feedback threaded fastening device that determines relatively accurately the tensile load in a bolt or similar fastening device comprising,
   an elongated threaded member capable of being secured through one or more workpieces which are adapted to be fastened together,
   a fastening member having a central threaded bore therethrough threadably receivable on said elongated member for securing said workpieces together as said fastening member is tightened on said elongated member,
   a pair of concave members disposed on said fastening member and being capable of deflection from a concave to a substantially flat condition as said fastening member is tightened over said elongated threaded member, said fastening member further including a pair of concentric recessed portions therein, one of said portions receiving and capturing said concave members therein, the other of said portions being shaped to permit the central area of said concave members to deflect therewithin without abrading or frictionally engaging the elongated threaded member and
   one or more radial notches disposed in said fastening member permitting said concave members to be viewed as the threaded member is tightened over said workpieces, said fastening member further including a series of sawtooth lands and grooves disposed about the perimeter of one surface thereof, said notches and said lands and grooves functioning to abraid or gall the first encountered workpiece surface effective when the fastening member is tightened over said threaded member to increase the torque being applied to the device tactilely indicating to an operator that the device has compressed the concave members to a height that would generate the correct bolt tensile load.

* * * * *